United States Patent [19]

Hunter

[11] Patent Number: 4,780,166
[45] Date of Patent: Oct. 25, 1988

[54] METHOD AND APPARATUS FOR PRODUCING ELONGATED ARTICLES FROM FIBER-REINFORCED PLASTIC MATERIAL

[75] Inventor: Gary A. Hunter, Houston, Tex.
[73] Assignee: Shell Oil Company, Houston, Tex.
[21] Appl. No.: 66,579
[22] Filed: Jun. 26, 1987
[51] Int. Cl.$^4$ .............................................. B29H 9/02
[52] U.S. Cl. ..................................... 156/180; 156/64; 156/359; 264/137
[58] Field of Search .............................. 156/180–181, 156/64, 378, 359; 264/134, 137

[56] References Cited

U.S. PATENT DOCUMENTS 3,793,108  2/1974  Goldsworthy ...................... 156/180
3,960,629  6/1976  Goldsworthy ................. 156/180 X

FOREIGN PATENT DOCUMENTS 51-20278  2/1976  Japan .................................... 264/137
1289136  9/1972  United Kingdom ................ 264/137

Primary Examiner—David Simmons
Attorney, Agent, or Firm—Paul I. Douglas

[57] ABSTRACT

A method and apparatus are disclosed for the fabrication of pultruded articles. The apparatus includes a means for heating the interior of a bundle of resin-wetted reinforcing material prior to the bundle passing into a heating forming die which heats the exterior of the bundle. Insertion of a thermocouple wire into the interior of the bundle prior to the bundle passing into the heated forming die allows the temperature of the bundle interior to be monitored during the curing process that occurs within the heating forming die. Adjustment of the bundle interior temperature relative to the bundle exterior temperature eliminates stresses caused by adverse thermal gradients that normally would exist without the use of such a bundle interior heater. Use of such a bundle interior heater allows the pultrusion of parts having a greater or thicker cross section than those now normally available.

26 Claims, 4 Drawing Sheets

METHOD AND APPARATUS FOR PRODUCING ELONGATED ARTICLES FROM FIBER-REINFORCED PLASTIC MATERIAL

BACKGROUND OF THE INVENTION

This invention relates to forming apparatus and more particularly to a pultrusion apparatus for forming shapes of reinforced plastic, wherein it is desired to fabricate a shape having a thick cross-section.

A review of a portion of the prior art discloses, in U.S. Pat. No. 2,871,911 issued to Goldsworthy et al., a resin reinforced glass fiber production apparatus with high frequency (radio frequency) heating of the shaping die, and (optional) external heating of the hardened roving by gas burners (Column 4).

U.S. Pat. No. 3,674,601 issued also to Goldsworthy discloses a pultrusion apparatus which has radio frequency (RF) heating and may have an externally heated finish die (claim 7). The finished stock can be virtually of any profile and any distribution of mass throughout the profile (Column 2).

U.S. Pat. No. 3,684,622 also issue to Goldsworthy discloses a pultrusion apparatus which has an (unheated) torpedo for introduction of resin into the interior zone of the composing tube (Column 7). RF or microwave heating is used.

None of these patents address the problem, when it is desired to pultrude a part having a particularly thick cross-section, of the internal cracking that results due to thermal stresses induced by uneven heating and cooling of the interior of the part relative to the exterior of the part during the gelling, and subsequent exothermic curing of the part.

A method and apparatus, therefore, need to be developed which will solve the problem of internal stress cracking due to the existence of an undesirable thermal gradient during the pultrusion process. Such a method and apparatus should blend into existing pultrusion process methods and equipment in order to allow manufacturers to increase the variety of pultruded cross-sections available to the public. More specifically, the method and apparatus of the current invention should allow the pultrusion of elongated articles having a cross-section greater than approximately 1" in diameter.

SUMMARY OF THE INVENTION

The apparatus of the present invention consists of a heater located upstream of the normally externally-heated die used in the pultrusion process. The heater is designed to heat the interior of the bundle of resin-wetted fibers prior to the bundle entering the externally-heated die.

Additionally, a fluid jacket having fluid flowing therethrough surrounds the bundle exterior upstream of the externally-heated die and is used in order to condition the temperature of the bundle exterior to a preselected value prior to the entrance of the bundle into the externally-heated die. Control of the temperature of the bundle interior and exterior in this manner establishes a desired thermal gradient across the cross-section of the bundle, prior to the bundle entering the externally-heated die.

It should be well recognized that if the desired temperature of the bundle exterior before entrance of the bundle into the externally-heated die approximates the surrounding ambient temperature, the fluid jacket need not be used.

Application of a sufficient amount of thermal energy to the bundle interior and temperature conditioning of the bundle exterior causes the bundle interior to have a higher temperature than the bundle exterior, prior to the bundle being drawn through the externally-heated die which applies additional thermal energy to the exterior of the bundle. The reverse thermal gradient established between the exterior and the interior of the bundle eliminates thermal stress induced fractures between the bundle interior and exterior during the resin curing step which takes place inside the externally heated die.

The elimination of thermal stress fractures allows the fabrication of a pultruded article having a relatively thick cross section not currently available from the apparatus and processes of the prior art.

The amount of thermal energy applied to the bundle interior by the interior heater is initially measured by the use of a thermocouple wire, having a thermocouple formed at one end thereof, which is inserted into the bundle interior prior to entrance of the bundle within the externally-heated die. Once the desired amount of thermal energy to be added has been determined, other stationary temperature measurement devices may be used to maintain the application of that desired amount of thermal energy to the bundle interior.

It is therefore an object of the invention to describe a process wherein pultruded articles having relatively thick cross sections may be fabricated without the occurrence of undesirable stress fractures between the interior and the exterior portions thereof.

It is a feature of the present invention to locate an interior heater upstream of the normal externally-heated die, so as to apply thermal energy to the interior of the bundle.

It is a further feature of the invention to insert a thermocouple within the interior of the bundle during the process of adjusting the amount of thermal energy applied to both the interior and exterior of the bundle.

It is a further feature of the present invention to condition the temperature of the bundle exterior to a preselected temperature prior to entrance of the bundle into the externally-heated die, by use of a fluid jacket which surrounds the bundle exterior.

It is a further object of the present invention to describe an apparatus that may be easily added to existing pultrusion apparatus.

These and other features, objects and advantages of the present invention will become apparent from the following detailed description, wherein reference is made to the figures in the accompanying drawings.

BRIEF DESCRIPTION OF THE DRAWINGS

FIG. 8 is a schematic representation in an end view of a sheath guide, taken along lines 8—8 of FIG. 3.

FIG. 9 is a schematic representation of a detail of the interior heater support means, taken along lines 9—9 of FIG. 3.

DESCRIPTION OF THE PREFERRED EMBODIMENT

Figure 1:
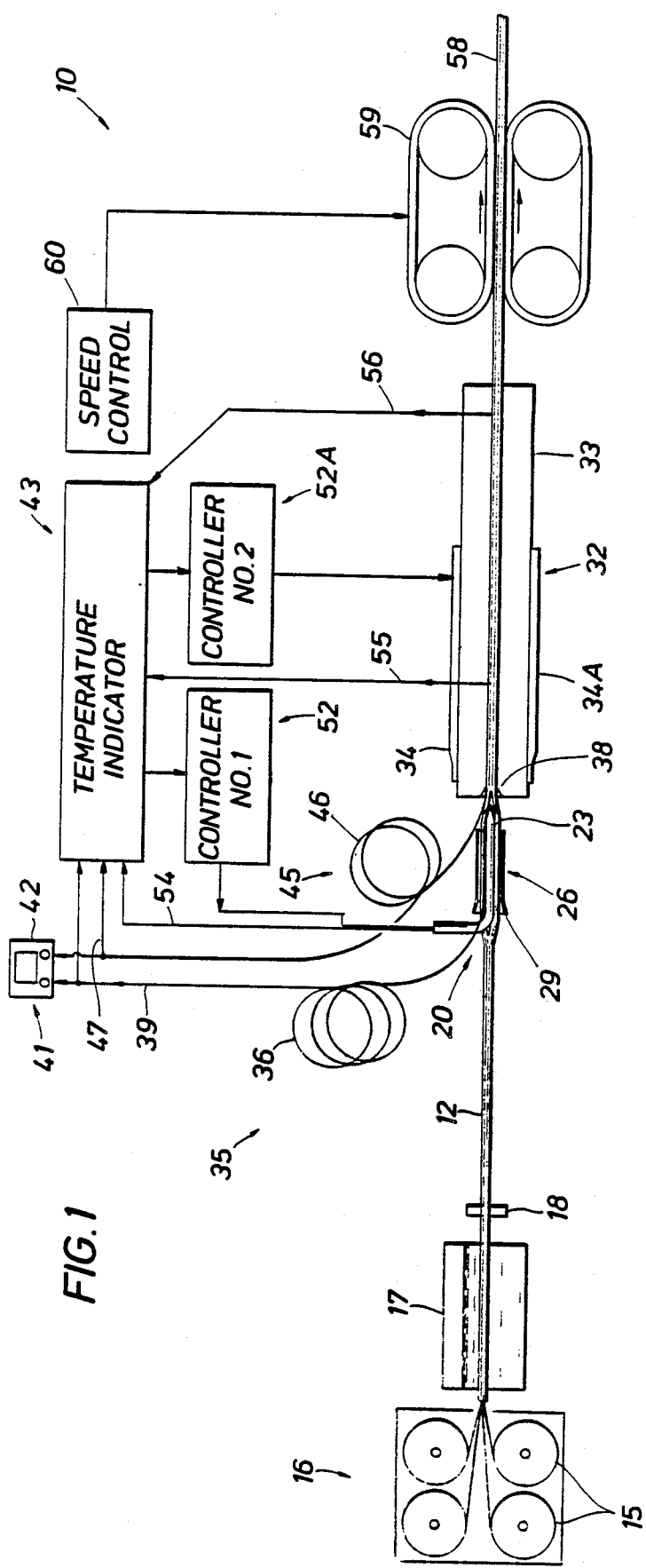
FIG. 1 is a schematic representation which shows the interior heater and the fluid jacket positioned upstream of the heated forming die.
Figure 2:
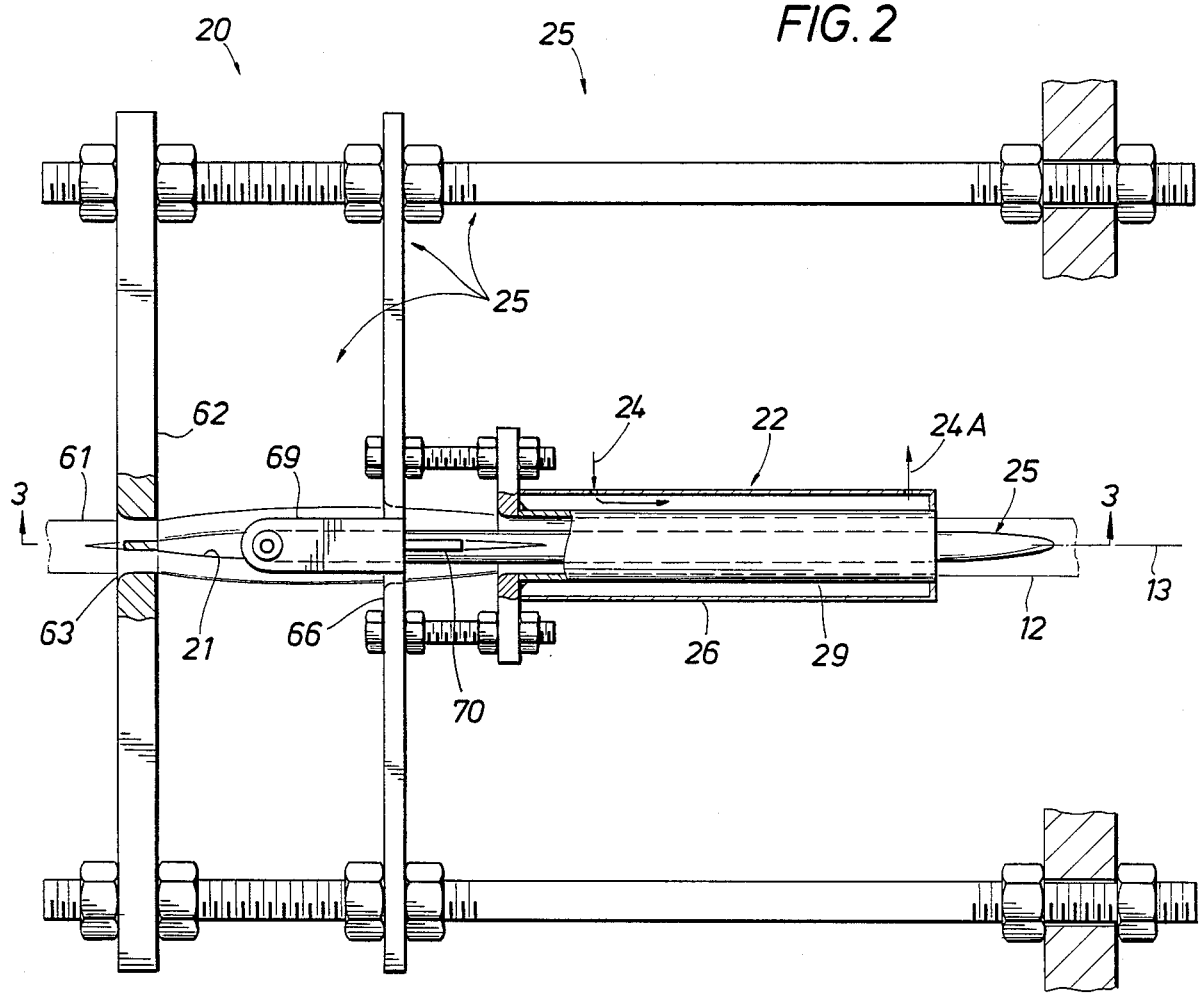
FIG. 2 shows a schematic representation in a top view in partial cross-section of the interior heater support means and the fluid jacket which surrounds the sheath.
Figure 3:
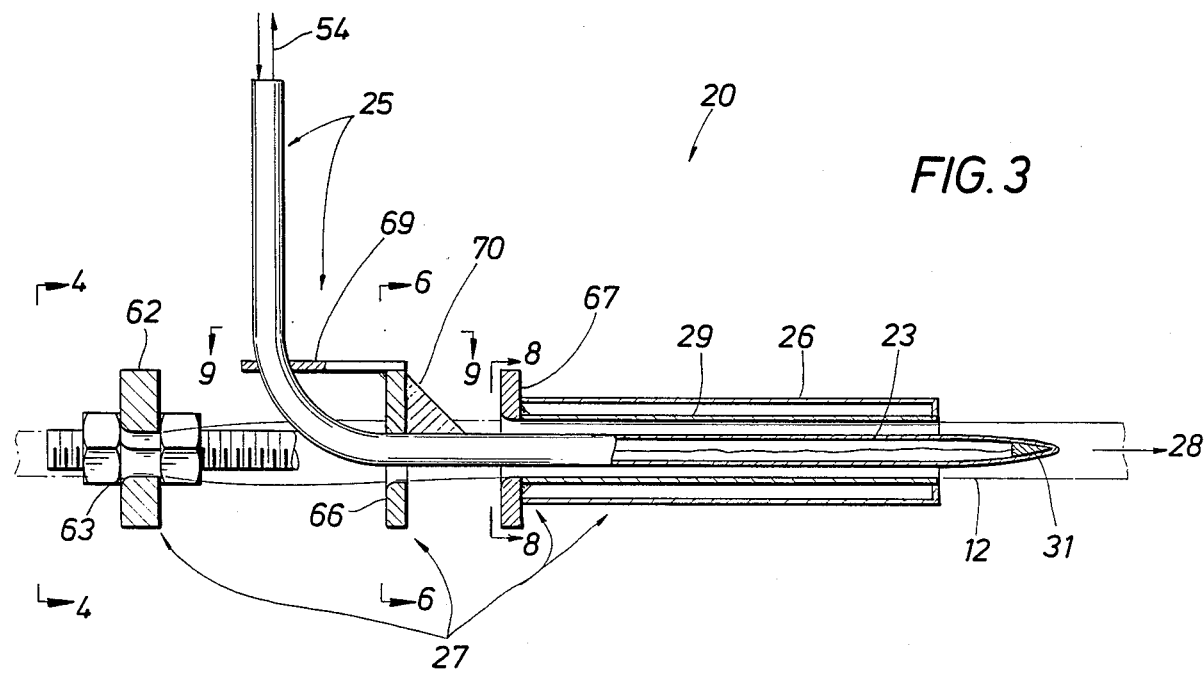
FIG. 3 shows a schematic representation in a side view in partial cross-section of the interior heater positioned within the interior heater support means and the fluid jacket which surrounds the sheath.
Figure 4:
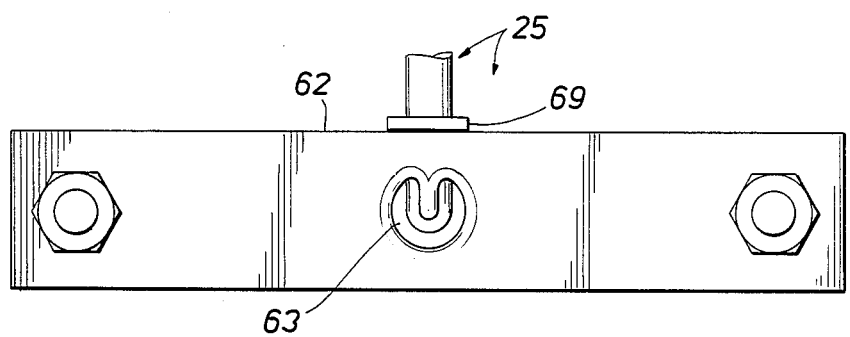
FIG. 4 shows a schematic end view of a vane guide located upstream of the interior heater support means, taken along lines 4—4 of FIG. 3.
Figure 5:
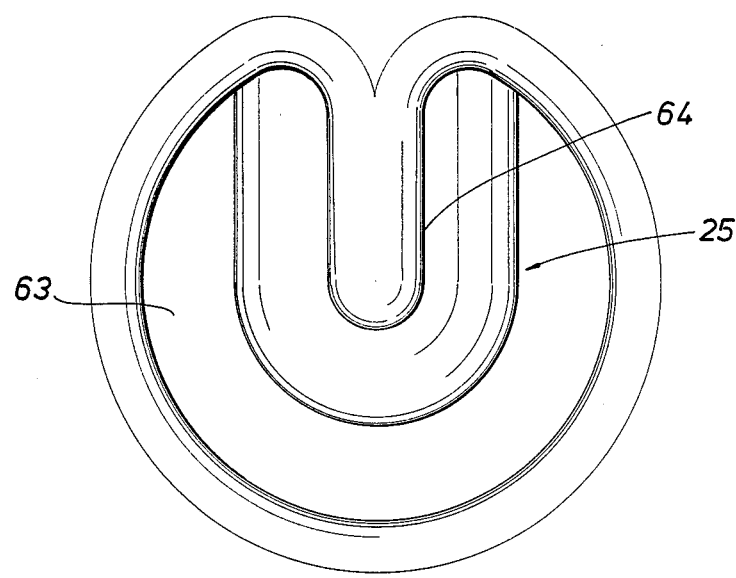
FIG. 5 is a schematic representation which shows in more detail the vane located within the bundle opening.
Figure 6:
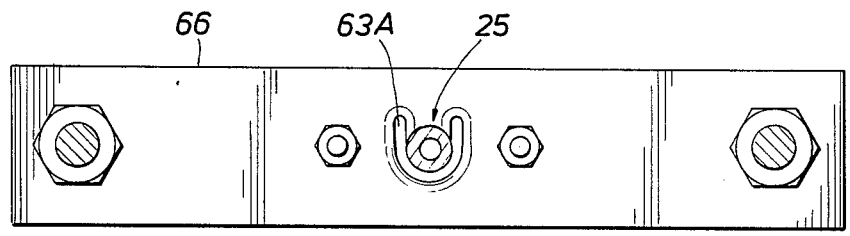
FIG. 6 shows a schematic representation of an entrance guide, taken along line 6—6 of FIG. 3.
Figure 7:
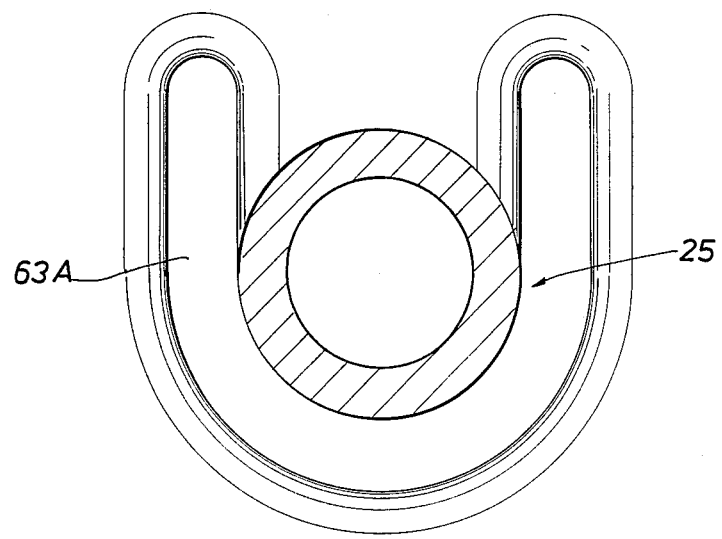
FIG. 7 shows a schematic representation of the bundle opening defined through the entrance guide.

Referring now to FIGS. 1, 2, and 3, a pultrusion apparatus 10 and a bundle 12 having a longitudinal axis 13 (FIG. 2) and a desired geometric cross-section is shown. The bundle 12 is being formed by drawing spools of fibers 15 from creel 16 through resin impegnation bath 17 and guide 18, prior to being drawn through interior heater means 20 as resin-wetted reinforcing material.

The interior heater means 20 heats the interior of the bundle 12 by supplying a first amount of thermal energy thereto as the bundle interior 21 is drawn about the interior heater means 20, a portion of the interior heater means 20 being positioned within the interior of the bundle 12.

The interior heater means 20 can be seen to further include an interior heater 23 (FIG. 1 and FIG. 3) which comprises in a preferred embodiment an electrical heating element. The interior heater 23 has at least one portion positioned within the bundle interior 21 in order to supply a first amount of thermal energy thereto. The interior heater 23 is carried by or operatively connected to a portion of interior heater support means 25.

In a preferred embodiment the interior heater 23 and its support structure formed by a rod bent into a relatively "L"-shaped structure, the entire assembly manufactured for example by Watlow Electric Manufacturing.

It should be well recognized that the interior heater 23 may take many other forms. A hot fluid such as oil or water which is circulated through the interior heater support means 25 would accomplish the same thermal effect as the electric heater element.

The interior heater means 20 can also be seen to include guide means 27 (FIG. 3) positioned about the path of travel 28 of the bundle 12 so as to direct the bundle interior about the portion of the interior heater support means 25 that contains the interior heater 23.

The guide means 27 can be seen to include a sheath 29 formed in an annular manner about the portion of the interior heater support means 25 that is positioned within the interior of the bundle. The sheath 29 is located a spaced distance 30 (FIG. 8) away from the interior heater support means so as to press the bundle interior 21 in tight sliding engagement with the portion of the interior heater means which supplies thermal energy to the bundle interior. The sheath 29 forces the resin-wetted material of the bundle to conform to the surface of the interior heater means and the interior surface of the sheath in order to insure good surface contact and heat transfer.

In an embodiment of the present invention the interior heater support means located within the bundle will have an outer diameter of ⅜", and the sheath 29 will have an inner diameter of 0.75", in order to form a final pultruded rod having an outer diameter of ½".

The interior heater means 20 can also be seen to include temperature measurement means 31 (FIG. 3), such as the joined ends of a thermocouple wire that form a thermocouple well known to the art located within the portion of the interior heater means that is positioned within the bundle interior 21, the temperature measurement means 31 being used to measure the temperature of the bundle interior 21. It is well recognized that many other thermocouple arrangements and positions may be used to accomplish the same temperature measuring effect.

Apparatus 10 can also be seen to include temperature conditioning means 22 such as a fluid jacket 26 formed about the sheath 29, the fluid jacket 26 having fluid flowing therethrough as represented by arrows 24, 24A, as is well known to the art. By adjustment of the temperature and the flow rate of the fluid which flows through the fluid jacket, the temperature of the bundle exterior may be maintained at a preselected value prior to entrance of the bundle into the externally-heated die.

As discussed earlier, the desired thermal gradient may be established across the bundle prior to the bundle entering the externally-heated die. The fluid flowing through the fluid jacket may be water, oil, or any other fluid having the desired heat transfer properties. The fluid temperature may be selected to increase or decrease the temperature of the bundle exterior prior to the bundle entering the die.

Apparatus 10 can be seen to also include exterior heater means 32 for heating the exterior of the bundle 12 by supplying a second amount of thermal energy to the bundle exterior as the bundle is drawn through the exterior heater means 32, the exterior heater means 32 being positioned about the exterior of the bundle 12. The exterior heater means 32 are typically known in the art as a heated forming die 33 having heater elements 34, 34A mounted on the sides of the die 33, the heater elements 34, 34A in a preferred embodiment covering approximately ⅓ of the total length of the die 33, the die in a preferred embodiment having an overall length of 36 inches.

The apparatus of the present invention also includes interior temperature measurement means 35 such as thermocouple wire A 36 for measuring the temperature of the bundle interior as the bundle passes through the interior heater means 20 and the exterior heater means 32. Thermocouple wire A 36 is inserted in the bundle interior at a location as shown in FIG. 1 prior to the bundle entering the interior heater means 20.

The interior temperature measurement means 35 would also include means for monitoring the signal A 39 from wire A 36 as the end of the thermocouple wire A 36 passes through the interior heater means 20 and the heated forming die 33. Such monitoring means includes temperature comparison means 41 such as graphing equipment 42 well known to the art as well as thermocouple signal mointoring means 43 such as a visual temperature indication display.

The apparatus can also be seen to include exterior temperature measurement means 45 such as thermocouple wire B 46 which measures the temperature of the bundle exterior as the bundle exterior passes through the interior heater means 20 and the exterior heater means 32. The thermocouple wire B 46 may be inserted adjacent the exterior of the bundle prior to the bundle entering the interior heater means 20. A signal B 47 may be monitored by the thermocouple signal monitoring means 43 as the joined ends of the thermocouple wire 46 pass through the interior heater means 20 heated forming die 33. Signal B 47 may also be supplied to the temperature comparison means 41.

The apparatus 10 also includes means for varying the first amount of thermal energy and the second amount of thermal energy applied to the bundle, as discussed earlier. Such means would include in a preferred embodiment temperature control means 52, 52A such as rheostats well known to the art capable of varying the amount of current applied to the heater elements 34, 34A and the interior heater 23. It is well recognized that temperature control means 52, 52A may be operated either manually, or automatically upon receipt of input signals from the thermocouple signal monitoring means 43, as is well known to the art.

As discussed below, once it has been determined that the correct amount of thermal energy is being supplied to the bundle interior and exterior by use of the thermocouple wires 36, 46, signal C 54 from temperature measurement means 31, and signal D 55 and signal E 56 from thermocouples located within the heated forming die 33, may be monitored in order to maintain the correct input of thermal energy to the bundle 12 by manual or automatic control of temperature control means 52, 52A.

Referring now also to FIGS. 4-9, guide means 27 can also be seen to include vane guide 62 having a bundle opening 63, and a downwardly directed vane 64 positioned in front of a portion of the interior heater support means 25 in order to cause the bundle 12 to divide prior to flowing about the interior heater support means 25. Guide means 27 also includes entrance guide 66 having a bundle opening 63A. Guide means also includes sheath guide 67 having a bundle opening 63B, the sheath guide 67 also forming a support for sheath 29.

Guide means 27 effectively manipulate portions of the bundle to allow relatively easily insertion of the interior heater means 20 within the bundle interior.

The interior heater support means 25 can also be seen to include brace A 69 and brace B 70.

In operation, the steps of the process can be described as follows. The bundle interior is heated by supplyng a first amount of thermal energy thereto as the interior is drawn about the interior heater means 20. The bundle exterior is then heated by supplying a second amount of thermal energy thereto as the bundle is drawn through the exterior heater means 32. The initial amounts of thermal energy are supplied by interior heater 23 and the heater elements 34, 34A of each respective heater means 20, 32 respectively.

The temperatures of the bundle interior and bundle exterior are measured as the bundle passes through the exterior heater means. The temperature of the bundle interior is measured by positioning the thermocouple wire A 36 in the interior of the bundle at least prior to the bundle entering the exterior heater means and preferably prior to the bundle entering the interior heater means 20, and by monitoring the signal A 39 from the thermocouple wire A 36 as the bundle passes through the exterior heater means. The step of positioning the interior temperature measurement means in the interior of the bundle is done by inserting the thermocouple wire A 36 in the interior of the bundle as the bundle interior is exposed and drawn about the interior heater means 20.

In a similar manner the temperature of the bundle exterior is measured by a positioning exterior temperature measurement means 45 such as thermocouple wire B 46 on the exterior of the bundle prior to the bundle entering the exterior heater means and preferably prior to the bundle entering the interior heater means 20, and thereafter monitoring the signal B 47 from the exterior temperature measurement means as the bundle passes through the interior heater means and exterior heater means. Preferably the joined ends of the thermocouple wire B 46 will be inserted adjacent the bundle exterior upstream of interior heater means 20.

Figure 10:
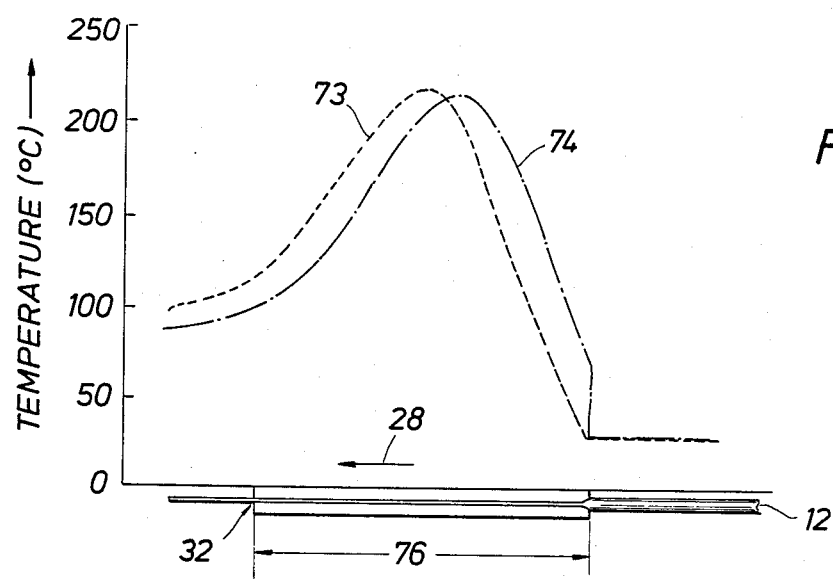
FIGS. 10 through 12 are graphical representations of the temperatures of the bundle interior and bundle exterior plotted along the length of the heated forming die, at various thermal energy input values supplied to the bundle by the exterior and interior heater means.
Figure 11:
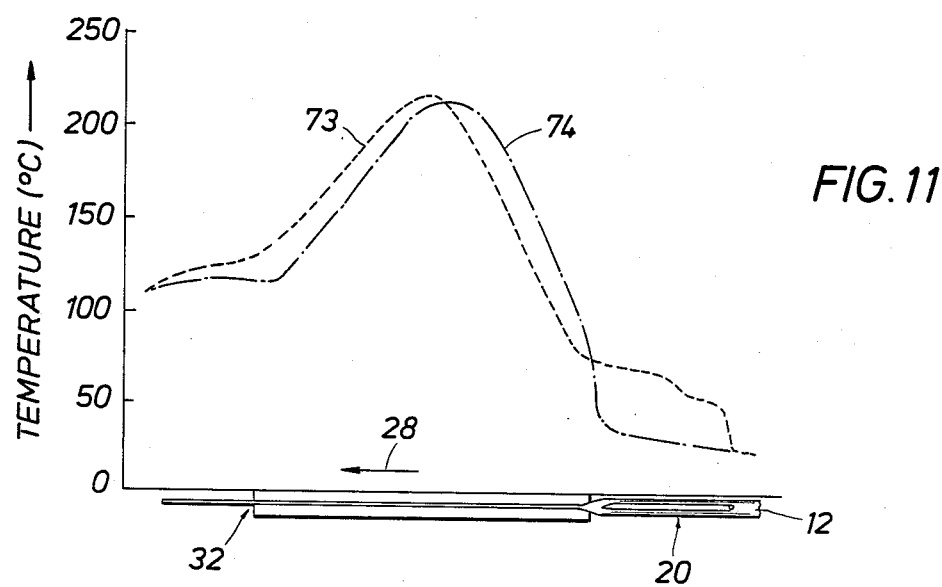
Figure 12:
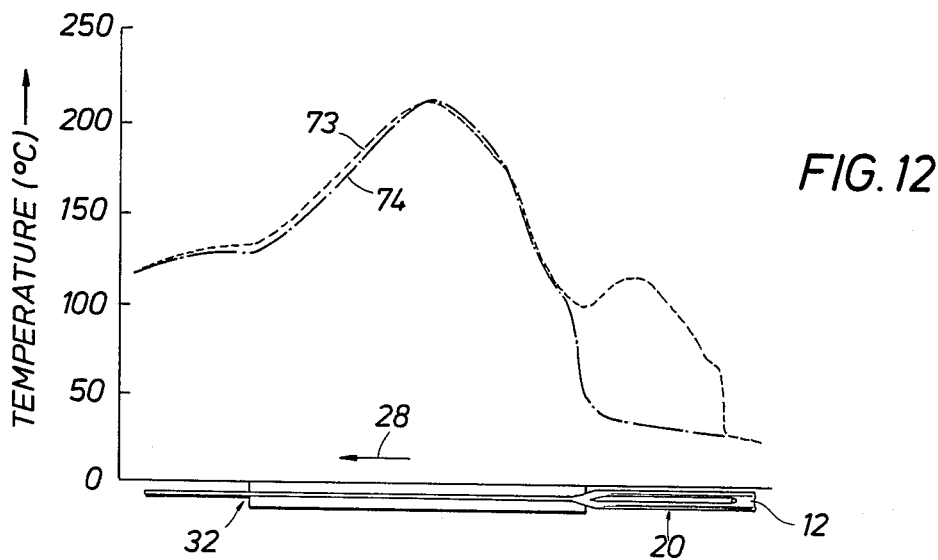

The amounts of thermal energy applied to the bundle interior and exterior may thereafter be varied if necessary. This process may be accomplished by comparing the temperature of the bundle interior to the temperature of the bundle exterior in a preferred embodiment by plotting the value of the bundle interior temperature and the bundle exterior temperature relative to the length(s) of the interior heater means and exterior heater means, as shown in FIGS. 10, 11, and 12. It is well recognized that other measurement methods may be used to accomplish the same comparison.

The temperature conditioning means 22 may also be used to condition the temperature of the bundle exterior to a preselected value prior to entrance of the bundle into the exterior heater means. It may be desirable, for example, to flow a sufficient amount of fluid through the fluid jacket 26 at 20 degrees centigrade so that the bundle exterior temperature is stabilized at a similar temperature, in order to eliminate variance in the pultrusion process due to changes in the ambient room temperature.

Alternatively, the fluid temperature and hence approximately the bundle exterior temperature may be maintained at 50 degrees centigrade when the bundle interior temperature is heated by the interior heater means to 100 degrees centigrade, so as to establish a 50 degrees centigrade thermal gradient between the bundle interior and exterior, if it is desired to do so. A process condition, i.e., the desired thermal gradient, now becomes entirely controllable upstream of the exterior heater means.

A point of novelty of the present invention is the insertion of the joined ends of the thermocouple wire A 36 into the bundle interior so as to monitor the change in the bundle interior temperature as the bundle passes through the exterior heater means 32. Applicant is not aware of a better method of measuring the interior temperature of the bundle as it passes through the exterior heater means. Once the end of the thermocouple wires 36, 42 have passed through the end of the exterior heater means such that the temperature information recorded by the ends of the thermocouple wires is no longer relevant to the current process, the wires 36, 46 may be cut on the upstream side of the pultrusion apparatus and the section of the pultrusion 58 that contains the thermocouple wires may then be discarded.

In this manner temperature profiles as shown in FIGS. 10 through 12 may be generated graphically by passing the thermocouple wires 36, 46 through the interior heater means and exterior heater means, as the thermal energy supplied to the bundle interior and exterior is adjusted. At the end of each graph generation, the thermocouple wires are severed from the graphing equipment 42 and the pultrusion 58 containing the wires as discarded. Once the pultrusion process has stabilized and repeatable results such as those shown in FIG. 12 are obtained the process may be run automatically by monitoring the thermocouple signals C, D, and E, 54, 55, and 56 respectively by maintaining the value of the signals equal to the values of the signals obtained when the desired temperature profile (such as shown in FIG. 12) was obtained using the inserted thermocouple wires 36, 42.

In general the temperature of the bundle interior should be maintained higher than the temperature of the bundle exterior as the bundle passes through the exterior heater means 30, though it is well recognized that in some situations with use of certain blends of resins and or filaments having certain volume and/or weight percentages it may be desired to maintain the bundle interior at a temperature less than the bundle exterior. In any event the first amount of thermal energy may be varied relative to the second amount of thermal energy by either increasing the first amount of thermal energy supplied through interior heater means 20 or by decreasing the second amount of thermal energy applied through exterior heater means 32.

Referring now to FIGS. 10-12 test results are presented during the fabrication of a ½" nominal diameter pultruded rod. The rod was fabricated using Epon® Resin 9310 and Epon® Curing Agents 9360 and Accelerator 537. The fibers used were fiberglass fibers type 2079 having a product code 13013-30100 manufactured by PPG Industries Incorporated. Route 4, Sealby, N.C. 28150. The weight fraction of glass to resin is 82% glass and 18% resin. The processing rate of the rod was 1 foot/minute. The temperature of the water which passed through the fluid jacket at a rate of 15 liters per minute was 20 degrees centigrade.

Referring now to FIG. 10 the bundle interior temperature 73 and the bundle exterior temperature 74 are shown potted as the bundle 12 passes through the length 76 of the exterior heater means 32, the path of travel of the bundle indicated by arrow 28. Temperatures 73, 74 were recorded by use of thermocouple wires 36, 46 as described earlier. Note the large thermal gradient existing between the exterior and the interior of the bundle, without use of an interior heater means. A first amount of thermal energy is being added to the bundle exterior, having a value of 800 watts.

Referring now to FIG. 11 the interior heater means 20 have been actuated to supply 320 watts of energy to the interior of the bundle 12 prior to the bundle entering the exterior heater means 32. Note that the differences of temperature between the bundle interior and exterior have decreased significantly by addition of the thermal energy to the interior of the bundle.

Referring now to FIG. 12 the thermal energy applied by the interior heater means has now been increased to 400 watts. Note in FIG. 12 that now the temperature of the bundle interior and exterior are now relatively equal, especially in the curing temperature range of approximately 175° C. and above. Such temperature parity minimizes the occurrence of undersirable stresses generated by temperature gradients existing between the interior and exterior of the bundle as the bundle cures. It was found after study of FIG. 12, that the optimum results were obtained by increasing the total wattage applied by the interior heater means to 440 watts. It has been found that when using this resin and filament system, it is desirable to maintain the interior of the bundle at a temperature equal to or greater than the exterior of the bundle in order to yield a properly cured pultruded part.

In a similar manner using the teachings of the present invention, it can be seen that the amount of the thermal energy applied by the interior heater means, the amount of the thermal energy applied by the exterior heater means, the amount of the temperature conditioning applied by the temperature conditioning means, and the feed rate can be "tuned" to get the desired (plug flow) cure of the part within the exterior heater means. The bundle 12 thereafter exits the exterior heater means, cools down naturally, and enters the takeoff machine 59 that controls the process rate.

Many other variations and modifications may be made in the apparatus and techniques herebefore described, both by those having experience in the technology, without departing from the concept of the present invention. Accordingly it should be clearly understood that the apparatus and methods depicted in the accompanying drawings referred to in the foregoing description are illustrative only and are not intended as limitations on the scope of the invention.

I claim as my invention:

1. A method of fabricating pultrusions by use of an interior heater means located upstream of an exterior heater means, said method comprising the steps of:
   heating the interior of a bundle of resin-wetted reinforcing material by supplying from said interior heater means a first amount of thermal energy to the interior of said bundle as said bundle interior is drawn about said interior heater means,
   heating the exterior of said bundle by supplying from said exterior heater means a second amount of thermal energy to the exterior of said bundle as said bundle is drawn through said exterior heater means,
   measuring the temperature of said bundle interior as said bundle passes through said exterior heater means,
   measuring the temperature of said bundle exterior as said bundle exterior passes through said exterior heater means, and
   varying as required said first amount of thermal energy and said second amount of thermal energy supplied to said bundle so as to maintain the temperature of said bundle interior at a value relative to the temperature of said bundle exterior.

2. The method of claim 1 wherein the step of measuring the temperature of said bundle interior as said bundle passes through said exterior heater means is done by,
   positioning interior temperature measurement means in the interior of said bundle prior to said bundle entering said exterior heater means, and
   monitoring the signal from said interior temperature measurement means as said bundle passes through said exterior heater means.

3. The method of claim 2 wherein the step of positioning interior temperature measurement means in the interior of said bundle prior to said bundle entering said exterior heater mreans is done by,
   inserting thermocouple wire in the bundle interior.

4. The method of claim 1 wherein the step of measuring the temperature of said bundle exterior as said bundle passes through said exterior heater means is done by, positioning exterior temperature measurement means on the exterior of said bundle prior to said bundle entering said exterior heater means, and monitoring the signal from said exterior temperature measurement means as said bundle passes through said exterior heater means.

5. The method of claim 4 wherein the step of positioning exterior temperature measurement means in the exterior of said bundle prior to said bundle entering said exterior heater means is done by, inserting thermocouple wire adjacent the exterior of said bundle.

6. The method of claim 1 wherein the step of varying as required said first amount of thermal energy and said second amount of thermal energy supplied to said bundle includes the further steps of;

comparing the temperature of said bundle interior to the temperature of said bundle exterior, and increasing said first amount of thermal energy relative to said second amount of thermal energy if the temperature of said bundle interior is less than said temperature of said bundle exterior.

7. The method of claim 6 wherein the step of comparing the temperature of said bundle interior to the temperature of said bundle exterior further includes the step of;

plotting the values of said bundle interior temperature and said bundle exterior temperature relative to the length of said exterior heater means.

8. The method of claim 6 wherein the step of increasing said first amount of thermal energy relative to said second amount of thermal energy is done by increasing said first amount of thermal energy.

9. The method of claim 6 wherein the step of increasing said first amount of thermal energy relative to said second amount of thermal energy is done by decreasing said second amount of thermal energy.

10. The method of claim 1 further including, prior to the step of heating the exterior of said bundle by supplying from said exterior heater means a second amount of thermal energy to the exterior of said bundle as said bundle is drawn through said exterior heater means, the step of:

conditioning the exterior of said bundle to a preselected temperature.

11. Apparatus for use in fabricating pultrusions, said apparatus comprising:

interior heater means for heating the interior of a bundle of resin-wetted reinforcing material by supplying a first amount of thermal energy to the interior of said bundle as said bundle interior is drawn about said interior heater means, a portion of said interior heater means being positioned within the interior of said bundle, exterior heater means for heating the exterior of said bundle by supplying a second amount of thermal energy to the exterior of said bundle as said bundle is drawn through said exterior heater means, said exterior heater means being positioned about the exterior of said bundle, means for measuring the temperature of said bundle interior as said bundle passes through said exterior heater means.

means for measuring the temperature of said bundle exterior as said bundle exterior passes through said exterior heater means, and means for varying said first amount of thermal energy and said second amount of thermal energy supplied to said bundle so as to maintain the temperature of said bundle interior at a value relative to the temperature of said bundle exterior.

12. The apparatus of claim 11 wherein said interior heater means further comprises;

an interior heater having a portion positioned within the interior of said bundle to supply a first amount of thermal energy to the interior of said bundle, and interior heater support means operatively connected to said interior heater to support said portion of said interior heater within said bundle interior.

13. The apparatus of claim 11 wherein said interior heater means further includes;

guide means positioned about the path of travel of said bundle to direct said bundle, said guide means including, a sheath, said sheath formed about said portion of said interior heater means positioned within the interior of said bundle, said sheath located a spaced distance away from said portion so as to place said bundle interior adjacent said portion.

14. The apparatus of claim 11 wherein said interior heater means further includes;

temperature measurement means located within said portion of said interior heater means positioned within the interior of said bundle, to measure the temperature of the bundle interior.

15. The apparatus of claim 11 further including means for conditioning the exterior of said bundle to a preselected temperature prior to entrance of said bundle into said exterior heater means.

16. The apparatus of claim 15 wherein the means for conditioning the exterior of said bundle to a preselected temperature comprises;

a fluid jacket defined about said bundle exterior, said fluid jacket having fluid of a preselected temperature flowing therethrough.

17. The Apparatus of claim 11 wherein the means for measuring the temperature of said bundle interior as said bundle passes through said exterior heater means comprises;

a thermocouple wire inserted in the interior of said bundle prior to said bundle entering said exterior heater means, and means for monitoring the signal from said thermocouple wire as the end of said thermocouple wire passes through said exterior heater means.

18. The Apparatus of claim 11 wherein the means for measuring the temperature of said bundle exterior as said bundle passes through said exterior heater means comprises;

a thermocouple wire inserted adjacent the exterior of said bundle prior to said bundle entering said exterior heater means, and means for monitoring the signal from said thermocouple wire as the end of said thermocouple wire passes through said exterior heater means.

19. The Apparatus of claim 11 wherein the means for varying said first amount of thermal energy and said second amount of thermal energy supplied to said bundle comprises;

means for increasing said first amount of thermal energy relative to said second amount of thermal energy.

20. The Apparatus of claim 19 wherein the means for increasing said first amount of thermal energy relative to said second amount of thermal energy comprises;

temperature controller means capable of controlling the amount of thermal energy supplied to said interior heater means and said exterior heater means.

21. Apparatus adapted to fabricate pultrusions, said apparatus comprising:

interior heater means capable of heating the interior of a bundle of resin-wetted reinforcing material by supplying a first amount of thermal energy to the interior of said bundle as said bundle interior is drawn about said interior heater means, a portion of said interior heater means being positionable within the interior of the said bundle, exterior heater means capable of heating the exterior of said bundle by supplying a second amount of thermal energy to the exterior of said bundle when said bundle is drawn through said exterior heater means, said exterior heater means being positionable about the exterior of said bundle, means capable of measuring the temperature of said bundle interior when said bundle passes through said exterior heater means, means capable of measuring the temperature of said bundle exterior when said bundle exterior passes through said exterior heater means, and means capable of varying said first amount of thermal energy and said second amount of thermal energy supplied to said bundle so as to maintain the temperature of said bundle interior at a value relative to the temperature of said bundle exterior.

22. The apparatus of claim 21 further including means capable of conditioning the exterior of said bundle to a preselected temperature prior to entrance of said bundle into said exterior heater means.

23. Apparatus for use in fabricating solid cross-section pultrusions, said apparatus comprising:

means for feeding a bundle of resin-wetted reinforcing material, interior heater means for heating the interior of said bundle of resin-wetted reinforcing material by supplying a first amount of thermal energy to the interior of said bundle as said bundle interior is drawn about said interior heater means, a portion of said interior heater means being positionable within the interior of said bundle; means to recombine said bundle in bonded relationship to produce said solid cross-section composite.

24. The apparatus of claim 23 further including means for conditioning the exterior of said bundle to a preselected temperature prior to entrance of said bundle into said exterior heater means.

25. A method of fabricating solid cross-section pultrusions by use of an interior heater means located upstream of an exterior heater means, said method comprising the steps of:

feeding a bundle of resin-wetted reinforcing material, heating the interior of said bundle of resin-wetted reinforcing material by supplying from said interior heater means a first amount of thermal energy to the interior of said bundle as said bundle interior is drawn about said interior heater means, and recombining of said bundle in bonded relationship to produce a solid cross-section composite.

26. The method of claim 25 further including the step of conditioning the temperature of said bundle exterior to a preselected temperature prior to entrance of said bundle into said exterior heater means.

* * * * *